US012492508B2

(12) United States Patent
Gözen Akin

(10) Patent No.: US 12,492,508 B2
(45) Date of Patent: Dec. 9, 2025

(54) BIOLEATHER PRODUCTION METHOD

(71) Applicant: GOZEN BIOWORKS CORP., Wilmington, DE (US)

(72) Inventor: Ece Gözen Akin, Bodrum/Muğla (TR)

(73) Assignee: GOZEN BIOWORKS CORP., Wilmington, DE (US)

( * ) Notice: Subject to any disclaimer, the term of this patent is extended or adjusted under 35 U.S.C. 154(b) by 171 days.

(21) Appl. No.: 18/277,073

(22) PCT Filed: Feb. 8, 2022

(86) PCT No.: PCT/TR2022/050105
§ 371 (c)(1),
(2) Date: Aug. 13, 2023

(87) PCT Pub. No.: WO2022/177529
PCT Pub. Date: Aug. 25, 2022

(65) Prior Publication Data
US 2024/0117564 A1 Apr. 11, 2024

(30) Foreign Application Priority Data
Feb. 19, 2021 (TR) .............. 2021/002338

(51) Int. Cl.
*D06N 3/02* (2006.01)
*B32B 3/08* (2006.01)
(Continued)

(52) U.S. Cl.
CPC ............. *D06N 3/02* (2013.01); *B32B 3/085* (2013.01); *B32B 7/12* (2013.01); *B32B 23/04* (2013.01);
(Continued)

(58) Field of Classification Search
CPC ...... D06N 3/02; D06N 3/0065; D06N 3/0088; D06N 2203/026; D06N 3/00; B32B 3/085;
(Continued)

(56) References Cited

U.S. PATENT DOCUMENTS

2020/0332327 A1* 10/2020 Keane ............... D06M 16/003

FOREIGN PATENT DOCUMENTS

| CA | 3022560 A1 | 5/2019 |
|---|---|---|
| EP | 3024887 A0 | 6/2016 |
| EP | 3715110 A1 | 9/2020 |

OTHER PUBLICATIONS

Gozen Akin, Ece, PCT/TR2022/050105, International Search Report, Mar. 24, 2022, 3 pages.
(Continued)

*Primary Examiner* — Cynthia L Schaller
(74) *Attorney, Agent, or Firm* — Rahman LLC

(57) ABSTRACT

The present invention relates to a grown bioleather (1), which can be used in all sectors where animal skin and artificial leather are used, resembles a genuine leather both physically and optically, does not contain any chemicals, and has cellulose produced by microorganisms as its raw material and production method thereof. With the bioleather production method (100), a bioleather that can be named as vegan leather is obtained, which leather prevents climate change and environmental pollution by reducing carbon emissions and supports sustainable development and green economy. The said bioleather (1) involves a bacterial weaving process, can decompose in soil in a short amount of time, is highly environmentally friendly, flexible and has high tensile strength and high mechanical strength.

27 Claims, 6 Drawing Sheets

Figure 1:
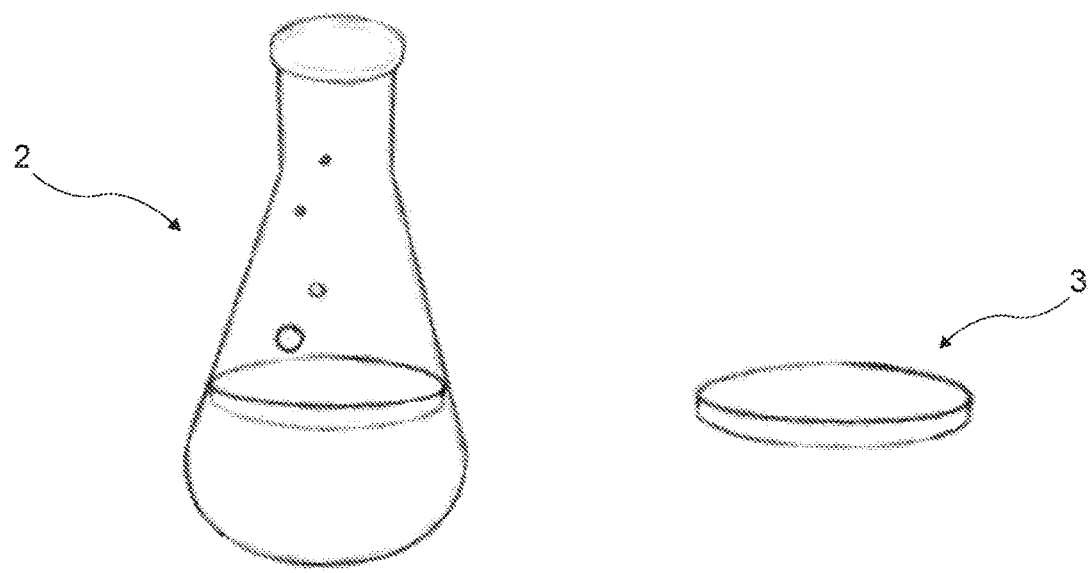

(51) Int. Cl.
*B32B 7/12* (2006.01)
*B32B 23/04* (2006.01)
*B32B 23/16* (2006.01)
*B32B 37/12* (2006.01)
*B32B 37/18* (2006.01)
*B32B 38/14* (2006.01)
*C08L 1/02* (2006.01)
*C12P 19/04* (2006.01)
*D06N 3/00* (2006.01)

(52) U.S. Cl.
CPC .............. *B32B 23/16* (2013.01); *B32B 37/12* (2013.01); *B32B 37/182* (2013.01); *B32B 38/14* (2013.01); *C08L 1/02* (2013.01); *C12P 19/04* (2013.01); *D06N 3/0065* (2013.01); *D06N 3/0088* (2013.01); *B32B 2317/18* (2013.01); *B32B 2437/00* (2013.01); *D06N 2203/026* (2013.01)

(58) Field of Classification Search
CPC  B32B 7/12; B32B 23/04; B32B 23/16; B32B 37/12; B32B 37/182; B32B 38/14; B32B 2317/18; B32B 2437/00; C08L 1/02; C12P 19/04; D21H 11/00
See application file for complete search history.

(56) References Cited

OTHER PUBLICATIONS

Gozen Akin, Ece, PCT/TR2022/050105, Written Opinion, Mar. 24, 2022, 4 pages.

\* cited by examiner

Figure 10

```
100
```

```
┌─────────────────────────────────────────────────────────────────────────────┐
│ Preparation of a solution as a raw material and preparation of a grown      │
│ microorganism culture (3) by addition of acetic acid and cellulose          │
│ producing bacteria and/or fungi into the prepared solution.                 │
└─────────────────────────────────────────────────────────────────────────────┘
                                    ↓ 101
┌─────────────────────────────────────────────────────────────────────────────┐
│ Preparation of a solution by addition of black tea, green tea extract and   │
│ glucose into pure hot water and preparation of ferementation liquid         │
│ medium (4) by addition of a mixture of acetic acid, glycerol and lichen     │
│ into the prepared solution                                                  │
└─────────────────────────────────────────────────────────────────────────────┘
                                    ↓ 102
┌─────────────────────────────────────────────────────────────────────────────┐
│ Transfer of the microorganism culture (3) to the growth baths (8) in the    │
│ liquid medium (4) and production of pure bacterial biopolymer layer (9) by  │
│ growing the same in static culture in the growth bath (8)                   │
└─────────────────────────────────────────────────────────────────────────────┘
                                    ↓ 103
┌─────────────────────────────────────────────────────────────────────────────┐
│ Obtaining a sterile biopolymer layer (S) by washing and purifying the       │
│ obtained biopolymer layer (9)                                               │
└─────────────────────────────────────────────────────────────────────────────┘
                                    ↓ 104
┌─────────────────────────────────────────────────────────────────────────────┐
│ Obtaining a dyed biopolymer layer (U) by vegetable-dyeing and tanning of    │
│ the sterile biopolymer layer (S)                                            │
└─────────────────────────────────────────────────────────────────────────────┘
                                    ↓ 105
┌─────────────────────────────────────────────────────────────────────────────┐
│ Placement of the produced dyed biopolymer layer (U) into the mold (6) and   │
│ laying of yarns (7) thereon                                                 │
└─────────────────────────────────────────────────────────────────────────────┘
                                    ↓ 106
┌─────────────────────────────────────────────────────────────────────────────┐
│ Laying of another dyed biopolymer layer (U) on top of the dyed biopolymer   │
│ layer (U) having the yarns (7) laid thereon, with the yarns (7) arranged    │
│ in between said layers                                                      │
└─────────────────────────────────────────────────────────────────────────────┘
                                    ↓ 107
┌─────────────────────────────────────────────────────────────────────────────┐
│ Bonding of the two dyed biopolymer layers (U) having yarns (7) arranged     │
│ between them with liquid gum arabic and glycerol-based natural adhesives    │
└─────────────────────────────────────────────────────────────────────────────┘
                                    ↓ 108
┌─────────────────────────────────────────────────────────────────────────────┐
│ Drying of the bonded dyed biopolymer layers (U) and performing a finishing  │
│ process                                                                     │
└─────────────────────────────────────────────────────────────────────────────┘
                                    ↓ 109
┌─────────────────────────────────────────────────────────────────────────────┐
│ Obtaining the bioleather (1)                                                │
└─────────────────────────────────────────────────────────────────────────────┘
                                      110
```

BIOLEATHER PRODUCTION METHOD

TECHNICAL FIELD

The present invention relates to a production method for grown bioleather, which can be used in all sectors where animal skin and artificial leather are used, resembles a genuine leather both physically and optically, does not contain any chemicals, and has cellulose produced by microorganisms as its raw material.

BACKGROUND ART

Owing to its durability and versatility, leather is a conventional material that has been used by humans since 2200 BC. The material consists of animal hide. Animals slaughtered for their hide include mainly lambs, sheep, goats, pigs, calves, cattle, crocodiles, snakes, lizards and kangaroos. It is known that in countries such as China, dogs are slaughtered for use as leather. Much of the leather produced originate from animals raised in countries where sensitivity for cruelty against animals is rather low. For industrial leather production, on the other hand, the required raw material is supplied from the livestock industry. It is estimated that this industry is responsible for 12-14.5% of global greenhouse gas emissions. Furthermore, grazing lands to be used in animal husbandry are increasingly burnt down and deforested, leading to loss of animal habitat, carbon emissions and carbon storage. The fact that leather is a by-product of the meat industry does not render it more sustainable, while the damage it causes to the environment is multifaceted. The first facet of environmental pollution is the pollution by raw materials used and chemical wastes, as well as contamination of water, soil and air with the same. The second facet, on the other hand, is that the products associated with this pollution are accumulated in plants, transmitted to animals, and enter into the food chain of humans and animals, leading to devastation of the ecosystem, and destruction of the local ecosystem after long-term exposure. Yet another facet is the food and water resources consumed by animals which are used as raw materials in leather production.

Worldwide leather production is approximately 20 billion square meters per year. 6.7 tons of raw leather, 57,000 liters of water and 3.35 tons of chemicals are required to produce 1 ton of finished leather. Currently 60 billion animals are needed to obtain products such as leather products, meat and eggs, with the number of animals we will need is expected to double in 2050, based on an estimated 10 billion increase in the human population until then. Conventional leather production comprises process steps such as raw leather storage and sorting, softening and liming, fleshing, splitting, bating, pickling, tanning, squeezing, sorting, scouring, tanning, neutralization, dyeing and oiling, drying, opening, sanding and finishing and all production processes require water and chemicals.

Current studies reveal that the leather industry has the highest impact regarding issues such as global warming, water consumption and environmental damage, deterioration of ecosystem quality, and resource utilization. Correspondingly, environmental and ethical concerns, increasing focus on animal rights, the strictness of laws governing the production of genuine leather, the rapid growth of the number of vegan people in the world and the growing vegan industry all boost the demand for synthetic leather materials. While artificial leather production provides a rather alternative material compared to conventional leather production, the use of petroleum-based synthetics and toxic materials that eventually mix with water, however, adversely affect human and environmental health. Both PU (polyurethane) and PVC (polyvinyl chloride) used in its production are obtained from fossil fuels. In the production of PU, for instance, hazardous materials such as methylene diphenyl isocyanate and toluene diisocyanate are required during manufacture. Synthetic leathers are problematic for the environment since they are not biodegradable and need centuries to decompose in the natural environment. With the combustion of these synthetic materials, toxic gases such as hydrogen chloride and carbon monoxide are released from polyurethane hydrogen cyanide and PVC. Although polyurethane- and PVC-based artificial leathers are more environmentally friendly than conventional cowhide leather, there is still a need for more sustainable alternatives to leather, with research into the environmental implications of artificially grown leather for the production of leather substitutes ever growing. As the production of these artificial leathers involves the use of harmful chemicals and release of harmful chemical gases to the environment, there is a need for a more environmentally friendly leather, which is produced without the use of any animal or petroleum-based chemicals.

Prior art European patent document numbered EP3715110 (A1) and priority dated 28 Mar. 2019 describes the production of bacteria-based cellulose to be used in the production of leather articles. In the process described in the aforementioned document, a mixture is formed by adding tea waste to the cellulose producing bacteria medium in boiled water and adding sucrose as the carbon source. When the mixture temperature drops below 30°, it is allowed to stay on a tanning plate for 15 days, after which it is expected to form a product. The product obtained is neutralized by using potassium hydroxide and acetic acid, whereby its defects are removed. Finally a process of drying is carried out. In the bioleather production method described in the patent application, firstly, a mixture is prepared by using black tea, green tea and glucose for the preparation of microorganisms, and then 100 ml of acetic acid and *Komagataeibacter Xylinus*, formerly known as *Acetobacter Xylinum* or *Gluconacetobacter Xylinus* and bacteria of the genus *Bacterium Gluconicum* as bacteria capable of producing cellulose and stock kombu fungus containing yeast of genera *Saccharomyces Cerevisiae* and *Schizosaccharomyces* Pombae are added to said mixture to obtain a polymer layer. Aforementioned details completely deviate from the European Patent document that specifies the present application. In addition, the present application and the aforemantioned European Patent document differ from each other in terms of leather production stages (washing, tanning, drying, etc.) and added chemicals.

A biopolymer layer and coating application is disclosed in the prior art document numbered US2016122568 (A1) and priority dated 26 Jul. 2013. In the said publication, cellulose is obtained by maintaining the appropriate temperature (30°) and degree of acidity in the bacteria-based cellulose production culture. Once the obtained layer is purified with acidic mixtures, it is used as a coating or cellulose film for different products. In the aforementioned patent document, cellulose is produced using bacteria.

However, in the method described in the current patent document, completely bio-based yarns are preferably placed between two biopolymer layers in the mold during the production of bioleather. In the bioleather production method described in the invention of the application, firstly a mixture is formed by using black tea, green tea and glucose during the preparation of microorganisms. Then acetic acid and *Komagataeibacter Xylinus*, formerly known as *Acetobacter Xylinum* or *Gluconacetobacter Xylinus* and bacteria of the genus *Bacterium Gluconicum* as bacteria capable of producing cellulose and stock kombu fungus containing yeast of genera *Saccharomyces Cerevisiae* and *Schizosaccharomyces* Pombae are added to said mixture. In addition, the present application completely deviates from aforementioned US Patent document in terms of leather production stages (washing, tanning, drying, etc.) and added chemicals.

Prior art US patent document numbered U.S. Pat. No. 4,912,049 (A) and priority dated 1 Oct. 1984 describes a production method for artificial leather (for use in applications like organ transplantation, etc. or as artificial leather). In the said document, bacteria-based cellulose is produced by using tea in a 30° water-sugar mixture containing bacterial culture. The produced film is used after washing with sodium hydroxide solutions and drying. While bacteria-based cellulose leather is produced in the aforementioned document, a bacterial biopolymer structure is obtained by using fungi in the present application. In the present application, bioleather is produced by obtaining a bacterial biopolymer structure using kombucha fungus. In the bioleather production method described in the present application, firstly a mixture is formed by using black tea, green tea and glucose during the preparation of microorganisms. Then 100 ml of acetic acid and *Komagataeibacter Xylinus*, formerly known as *Acetobacter Xylinum* or *Gluconacetobacter Xylinus* and bacteria of the genus *Bacterium Gluconicum* as bacteria capable of producing cellulose and stock kombu fungus containing yeast of genera *Saccharomyces Cerevisiae* and *Schizosaccharomyces* Pombae are added to said mixture. The aforementioned process distinguishes the application from other patent documents.

The bioleather and its production method described in the application are produced without the use of any animal or petroleum-based chemicals. Bioleather produced by the method described in the application can also be called "ecological leather" or "vegan leather". In the bioleather production method of the invention of the application, bacterial cellulose and bacterial cellulose composites which provide optical and mechanical properties that most resemble an original leather are used as raw materials. Bacterial cellulose obtained by the bioleather method described in the application has a structure which is similar to both the collagen structure and the connective tissue between the collagens found in raw animal skin. In the present art, there is no disclosure of the production method described in the application and the technical consequences of the application. In the current applications, there is no mention of a bioleather production method using bacterial cellulose, wherein no animal or petroleum-based chemicals are used.

Objects of Invention

An object of this invention is to realize a vegan-type bioleather production method, which prevents climate change and environmental pollution by reducing carbon emissions and supports sustainable development and green economy.

Another object of the present invention is to realize a bioleather production method comprising a unique bacterial weaving process.

Another object of the present invention is to realize a bioleather production method, wherein the bioleather decomposes in soil in a short amount of time, is environmentally friendly, flexible, has high tensile strength and high mechanical strength properties.

Another object of the present invention is to realize a bioleather production method, which, with respect to raw materials and manufacturing methods used, contributes to the prevention of climate change and environmental pollution by reducing greenhouse gas emissions associated with conventional leather and animal farms.

Another object of this invention is to realize a bioleather production method, wherein the bioleather is capable of fully decomposing in soil in a short amount of time and its raw material does not contain petroleum and toxic substances, in conformity with the increase in demand for natural materials and sustainable production methods, with said demand having changed drastically during the pandemic and the global climate change crisis.

Another object of the present invention is to realize a bioleather production method, wherein the bioleather can be used as an alternative to animal hide, without the need to slaughter any animal.

Another object of the present invention is to realize a bioleather production method that minimizes the consumption of time, energy and other water resources for animal husbandry.

Another aim of the present invention is to realize an environmentally friendly bioleather production method that is completely sustainable, both in terms of the material itself and the production methods applied.

Another object of the present invention is to realize a bioleather production method, wherein the bioleather has high-absorbency and high mechanical properties and can be used in the textile and leather industry.

Another object of this invention is to realize a bioleather production method that reduces the economic costs with the use of organic waste fractions of lichens as the main carbon and nitrogen source in the production of bacterial cellulose that is used as a raw material for bioleather.

Another object of the present invention is to realize a bioleather production method, wherein the bioleather has a tensile strength twice as high as leather, with said property being a true indicator for use as a leather substitute.

Another aim of the present invention is to realize a bioleather production method wherein the bioleather has the same appearance on both surfaces, with said appearance being similar to that of genuine leather.

SUMMARY OF INVENTION

A bioleather production method, as defined in the first claim and other claims depending on this claim, realized in order to achieve the object of the present invention, is carried out in such a way that an artificially grown leather is formed, which is similar to genuine leather and does not contain chemicals. Firstly, a solution is prepared by adding as raw material 8 grams of black tea extract and 25 grams of glucose into 1 liter of pure water. Thereafter, when the prepared solution reaches the appropriate temperature, 100 ml of acetic acid and cellulose producing bacteria and/or fungi are added. An enriched microorganism culture is prepared by allowing the added bacteria and/or fungi to grow. A solution is prepared by adding 1-10% of black tea, 1-10% of green tea extract and 1-10% of glucose to pure hot water. When the prepared solution reaches the appropriate temperature, a mixture of 1-5% acetic acid, 1-5% glycerol and 1-10% lichen is added into it, and the fermentation liquid medium is prepared. Then, liquid medium and the microorganism culture is transferred to the growth baths. Then, a pure bacterial biopolymer layer is produced in static culture in a growth bath.

A sterile biopolymer layer is obtained by washing and purifying the obtained biopolymer layer. A dyed biopolymer layer is obtained by vegetable-dyeing and tanning of the sterile biopolymer layer. The produced biopolymer layer is placed in the mold. Yarns are placed on the biopolymer layer. In the following step, another produced biopolymer layer is placed on top of the biopolymer layer having the yarns placed thereon. Thus, the yarns are arranged between the two biopolymer layers. The two biopolymer layers are then preferably joined to each other by adhesive bonding. Depending on the size of the two biopolymer layers having yarns arranged between them, these are combined with 1-5% liquid gum arabic and 1-5% glycerol-based natural adhesives. The combined biopolymer layers are dried and a finishing process is carried out. A bioleather is obtained after drying the biopolymer layers and performing the finishing process. Finally, preferred design products (bags, shoes, wallets, etc.) can be produced with the bioleather obtained. With the said bioleather production method, production of bioleather can be achieved between 7 and 14 days.

DETAILED DESCRIPTION OF THE INVENTION

The bioleather production method carried out to achieve the objects of the present invention is shown in the attached figures, which are;

FIG. 1. Front view of the stock culture and culture of microorganisms grown in said stock culture.

Figure 2:
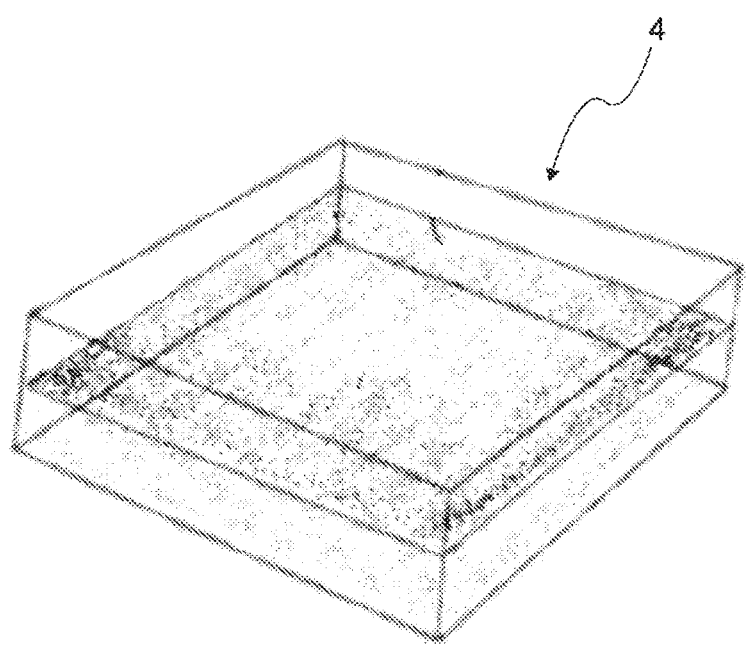

FIG. 2. Perspective view of the liquid medium.

Figure 3:
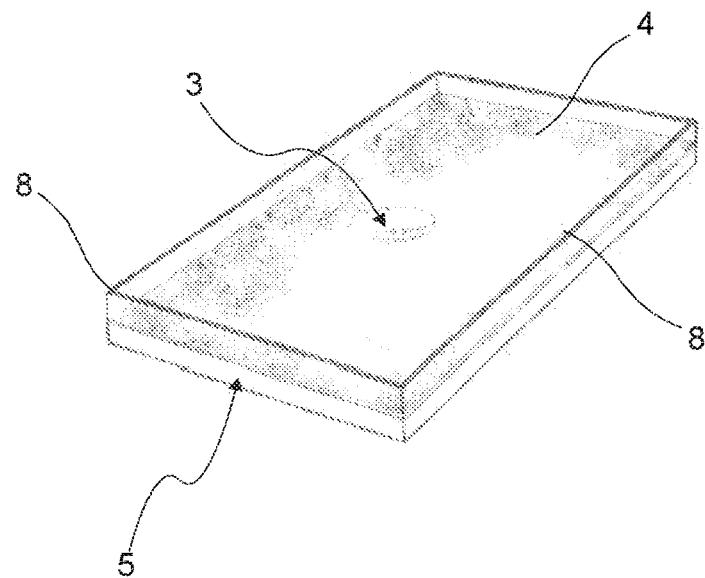

FIG. 3. Perspective view of the grown microorganism culture and liquid medium placed in the growth bath.

Figure 4:
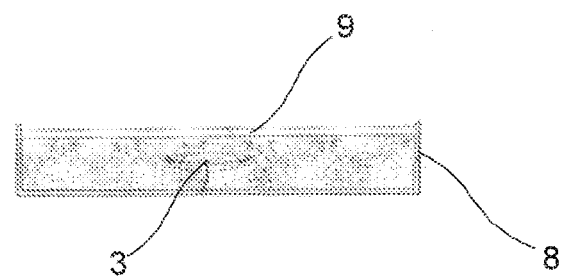

FIG. 4. Cross-sectional view of the biopolymer layer formed by the grown microorganism culture in the growth bath.

Figure 5:
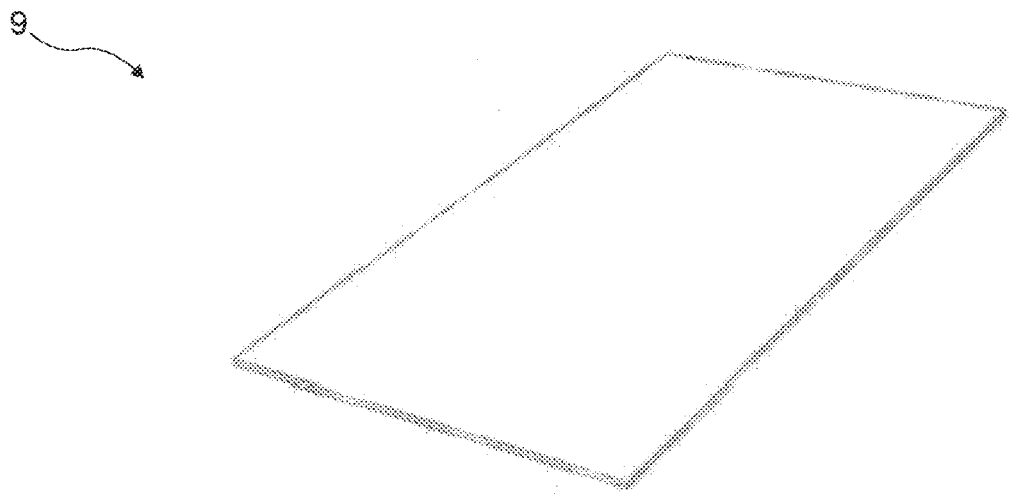

FIG. 5. Perspective view of the biopolymer layer.

Figure 6:
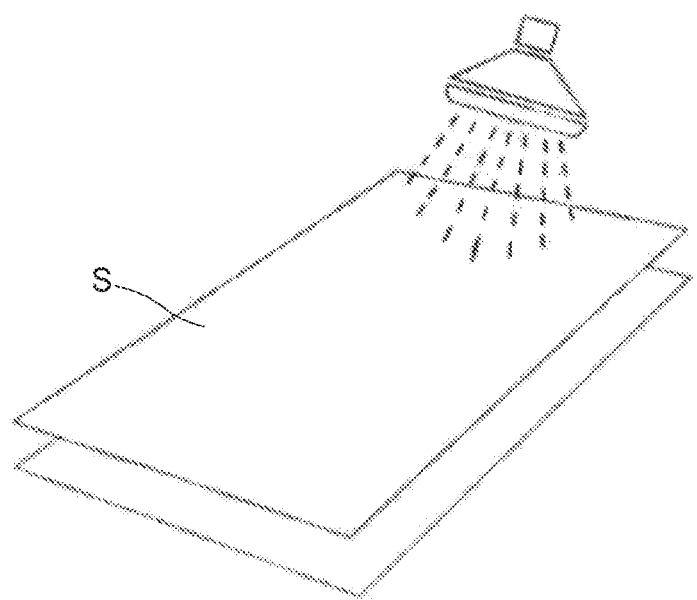

FIG. 6. A view of the process step in which the biopolymer layers are washed and purified.

Figure 7:
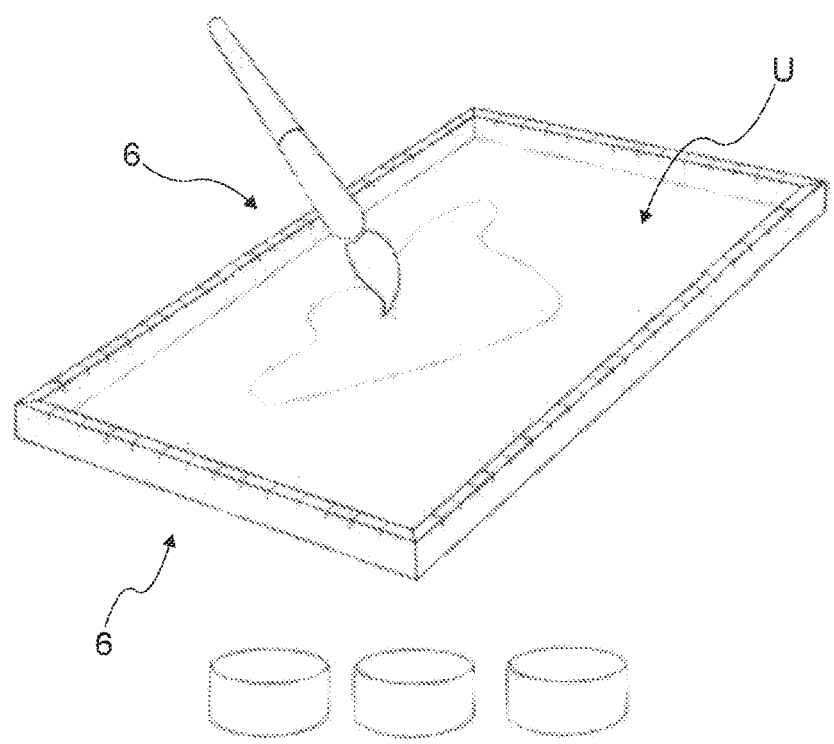

FIG. 7. A view of the process step for dyeing and tanning of the sterilized biopolymer layer in the mold.

Figure 8:
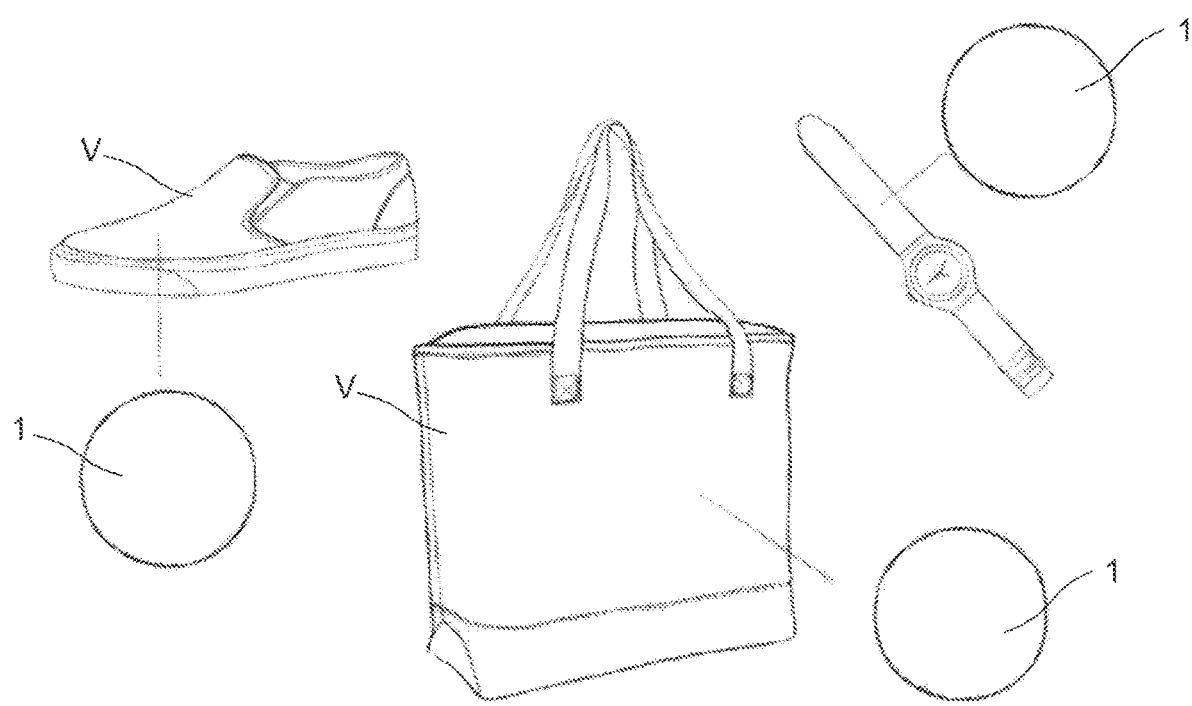

FIG. 8. A view of the bioleather produced and the bioleather products manufactured with the said bioleather.

Figure 9:
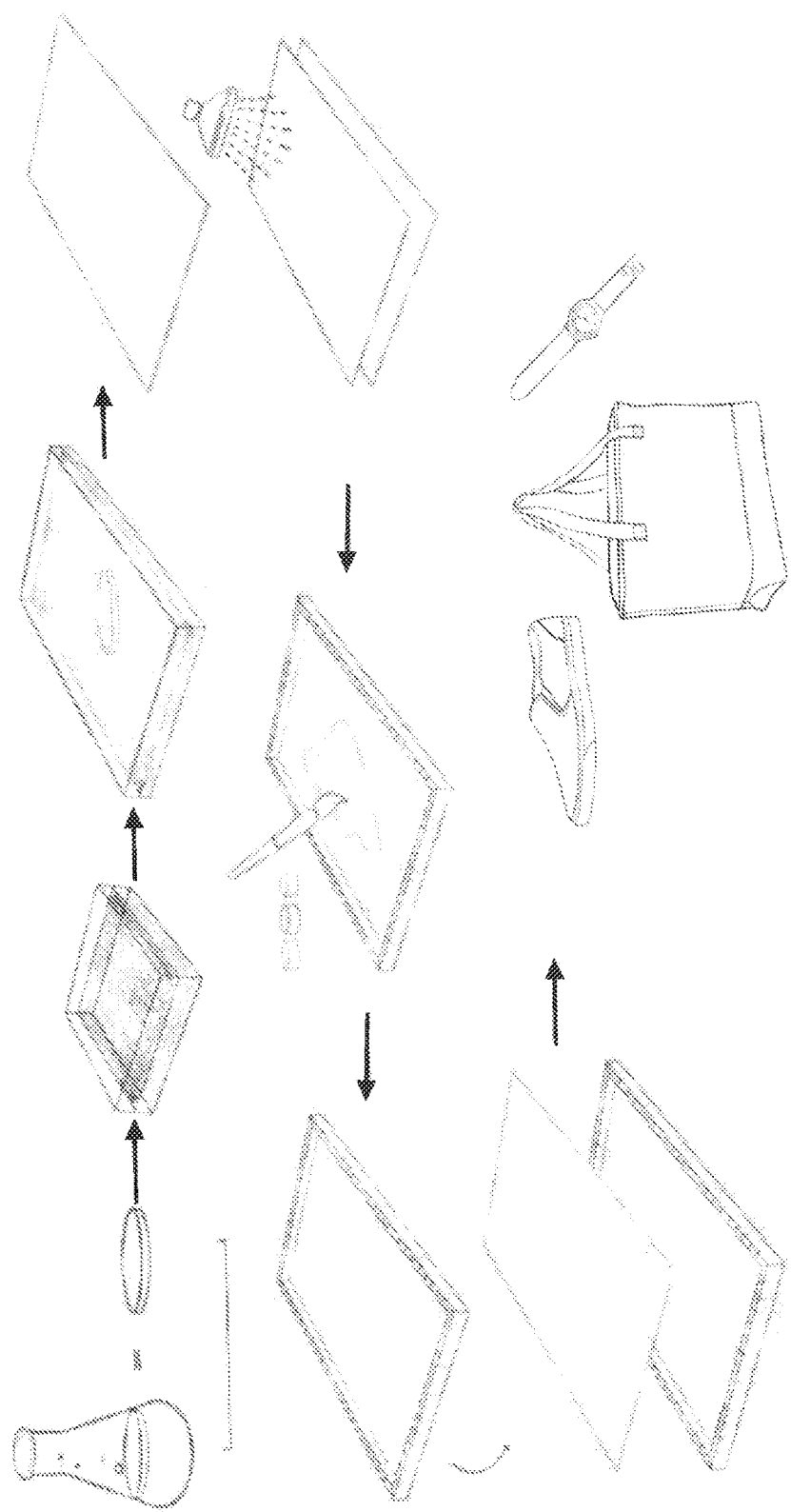

FIG. 9. Schematic view of the bioleather production method.

FIG. 10. A view of the flow chart of the bioleather production method.

The parts in the figures are numbered individually and the correspondence of these numbers are given below.
1. Bioleather
2. Stock culture
3. Grown microorganism culture
4. Liquid medium
5. Culture medium
6. Mold
7. Yarn
8. Growth bath
9. Biopolymer layer
S. Sterilized biopolymer layer
U. Dyed biopolymer layer
V. Bioleather product
100. Bioleather production method Production method (100) for a bioleather, which is similar to genuine leather and grown under artificial conditions without chemicals, wherein the production method includes its most basic form the process steps of:

Preparation of a solution by addition of black tea extract and glucose into pure water as raw material and addition of acetic acid and cellulose producing bacteria or cellulose producing fungus or cellulose producing bacteria with fungus in the prepared solution when it reaches a temperature in the interval of 20-40° C. and preparation of a grown microorganism culture (3) by growing said bacteria or fungi (101), Preparation of a solution by addition of 1-10% black tea extract, 1-10% green tea extract and 1-10% glucose into pure hot water and preparation of a fermentation liquid medium (4) by addition of a mixture of 1-5% acetic acid and glycerol and 1-10% lichen into the prepared solution when it reaches an appropriate temperature (102), Transfer of the microorganism culture (3) to the growth baths (8) in the liquid medium (4) and production of pure bacterial biopolymer layer (9) by growing the same in static culture in the growth bath (8)-(103), Obtaining a sterile biopolymer layer (S) by washing and purifying the obtained biopolymer layer (9)-(104).

Obtaining a dyed biopolymer layer (U) by vegetable-dyeing and tanning of the sterile biopolymer layer (S)-(105), Placement of the produced dyed biopolymer layer (U) into the mold (6) and laying of yarns (7) on it (106), Laying of another dyed biopolymer layer (U) on top of the dyed biopolymer layer (U) having the yarns (7) laid thereon, with the yarns (7) arranged in between them (107), Bonding of the two dyed biopolymer layers (U) having yarns (7) arranged between them with liquid gum arabic and glycerol-based natural adhesives (108), Drying of the bonded dyed biopolymer layers (U) and performing a finishing process (109), Obtaining a bioleather (1) after drying of the dyed biopolymer layers (U) and performing the finishing process (110).

In the bioleather production method (100) of the application, a bioleather (1) is produced, which is similar to genuine leather and grown in artificial conditions without chemicals. With the bioleather production method (100), a bioleather production is realized, wherein the bioleather has vegan properties, prevents climate change and environmental pollution by reducing carbon emissions and supports sustainable development and green economy. With the bioleather production method (100), a bioleather production comprising a unique bacterial weaving process is realized. With the bioleather production method (100), a bioleather production is realized, wherein the bioleather can decompose in soil in a short time, is environmentally friendly, flexible, has high tensile strength and high mechanical strength properties. With the bioleather production method (100), a bioleather production is realized, which, with respect to raw materials and manufacturing methods used, contributes to the prevention of climate change and environmental pollution by reducing greenhouse gas emissions associated with conventional leather and animal farms. With the bioleather production method (100), a bioleather production is realized, wherein the bioleather is capable of fully decomposing in soil in a short amount of time and whose raw material does not contain petroleum and toxic substances, in conformity with the increase in demand for natural materials and sustainable production methods, with said demand having changed drastically during the pandemic and the global climate change crisis. With the bioleather production method (100), a bioleather production is realized, wherein the bioleather can be used as an alternative to animal hide without the need to slaughter any animal. With the bioleather production method (100), a bioleather production is realized, which minimizes the consumption of time, energy and other water resources for animal husbandry. With the bioleather production method (100), a bioleather production is realized, which is environmentally friendly and completely sustainable, both in terms of the material itself and the production methods applied. With the bioleather production method (100), production of a bioleather with high absorbency and high mechanical properties is realized, which represents a new embodiment that can be applied in the textile and leather industry. With the bioleather production method (100), a bioleather production method is realized, which reduces the economic costs with the use of organic waste fractions of lichens as the main carbon and nitrogen source in the production of bacterial cellulose that is used as a raw material for bioleather. With the bioleather production method (100), a bioleather production method is realized, wherein the bioleather has a tensile strength twice as high as leather, with said property being a true indicator for use as a leather substitute. With the bioleather production method (100), a bioleather production is realized, wherein the bioleather has the same appearance on both surfaces, with said appearance being similar to that of genuine leather.

In the bioleather production method (100) according to an embodiment of the invention, a bioleather production (1) is described, wherein the bioleather is grown in artificial conditions, resembles genuine leather both physically and optically, does not contain any chemical and carcinogenic substances, or the raw material of which is produced by microorganisms without the need for slaughtering animals. The raw material of the bioleather (1) produced by the bioleather production method (100) is bacterial cellulose. Aforementioned bioleather raw material is also called bacterial biopolymer produced by microorganisms. In the bioleather production method (100), which is subject of the present application, the biopolymers in question are described as environmentally friendly polymers synthesized by living organisms, mostly produced from biodegradable, non-toxic and edible resources. Bacterial cellulose as the raw material of bioleather (1), on the other hand, is one of the major biopolymers.

In the bioleather production method (100), firstly the pre-growing of microorganisms capable of producing cellulose is performed (101). In the said process step of 101, a solution is prepared as a raw material by adding 8 grams of black tea extract and 25 grams of glucose into 1 liter of distilled water, and when the prepared solution reaches the appropriate temperature, 100 ml of acetic acid and cellulose producing bacteria and/or fungi are added and a grown microorganism culture (3) is prepared by growing the said bacteria or fungi (101). After preparation of the said solution in the process step (101), 100 ml of acetic acid and cellulose producing bacteria and/or fungi are added thereinto as soon as the temperature of the prepared solution drops to the range of 20-40° C., preferably below 30° C. Thus, a grown microorganism culture (3) is prepared by growing the said bacteria or fungi.

A stock culture (2) is formed by growing stock kombu moulds containing as the said microorganisms capable of producing cellulose *Komagataeibacter Xylinus*, formerly known as *Acetobacter Xylinum* or *Gluconacetobacter Xylinus* and bacteria of the genus *Bacterium Gluconicum* and yeast of the genus *Saccharomyces Cerevisiae* and *Schizosaccharomyces Pombae*. A grown microorganism culture is obtained by the help of the stock culture formed with microorganisms capable of producing cellulose.

Pure bacterial biopolymer layer (9) as the raw material of bioleather (1), in other words, pure bacterial cellulose is obtained by fermentation with the microorganism culture (3) obtained by growing.

Bacterial cellulose (biopolymer layer) as the raw material of the bioleather (1) of the invention, which intention is the subject of present application, is used to make edible desserts in the food industry, to create artificial tissues, to treat burns and ulcers in the medical industry, and to facilitate the absorption of creams, tonics and nail polishes in the cosmetic industry. The bacterial cellulose in question is also used in the manufacture of headphones since it transmits sound waves very well. However, since the carbon sources used in the production of bacterial cellulose such as sucrose, mannitol, glycerol, soybean extract, peptone, malt extract are very expensive, its production has become extremely difficult.

In the bioleather production method (100) used in this embodiment of the invention, after the culture of grown microorganisms is prepared, a solution is prepared by adding 1-10% black tea extract, 1-10% green tea extract and 1-10% glucose to pure hot water (101). In a preferred embodiment of the invention, a solution is prepared by adding 3% of black tea extract, 2% of green tea extract, and 8% of glucose to pure hot water (102). When the solution prepared in process step 102 reaches the appropriate temperature, preferably below 30° C., a fermentation liquid medium (4) is prepared by adding 1-5% of acetic acid and glycerol and 1-10% of lichen mixture thereinto.

While preparing the fermentation liquid medium (4), "*Parmelia Sulcata*" and "*Hypogymnia Tubulosa*" lichen species fallen from the trunk or branches of the trees and are found on it, which are found in nature as organic waste, are used as the main carbon source. In the bioleather production method (100), when the temperature of the solution obtained in the process step 102 drops below 30° C., a liquid medium (4) is obtained by adding a mixture of 2% acetic acid, 2% glycerol, 5-10% *Parmelia Sulcata* and 5-10% *Hypogymnia Tubulosa* lichen extract into the solution as carbon and nitrogen sources.

Leafy lichen species called "*Parmelia Sulcata*" used in process step 102 of the bioleather production method (100) are used in folk medicine to treat severe, acute colitis and gastrointestinal system diseases. The drugs produced from the extracts of the leafy lichen species called "*Parmelia Sulcata*" have a regenerative and tranquilizing effect on the mucous membrane of the respiratory tract. "*Hypogymnia Tubulosa*" lichen species are known to have antimicrobial effects against bacteria such as *E. Coli*.

By using the lichens used in the process step 102 of the bioleather production method (100) as the raw material of the bacterial cellulose (9), natural wastes are transformed into wealth and at the same time, the damage caused by the leather and artificial leather industry to the environment is meant to be minimized by the fermentation production method. With the fermentation liquid medium (4) formed in the process step 102, an industrial production method with a very low carbon emission and a production process that is highly supportive of the green economy and the prevention of climate change are achieved.

In the bioleather production method (100), the microorganism culture (3) is transferred into the growth baths (8) in liquid medium (4) after the preparation (102) of the fermentation liquid medium (4) (103). Following the transfer of microorganism culture (3) into the growth baths (8) in the liquid medium (4), pure bacterial biopolymer layer (9) is produced by growth in static culture in the growth bath (8)-(103). The geometric form (dimensions of width, length) of the growth bath (8) used is identical to the geometric form of the biopolymer layer (9) and the geometric form of the mold (6) on which the biopolymer layer (9) is placed. Thus, the geometric form of the bioleather (1) produced is also identical with the geometric form (dimensions of width, length) of the growth bath (8), the biopolymer layer (9) and the geometric form of the mold (6) on which the biopolymer layer (9) is placed. A mold (6) can be selected depending on the field of use of the bioleather (1), in other words, the form of the bioleather (1) to be processed. For example, if a bag is to be produced with the bioleather, a bioleather (1) can be produced in accordance with the pattern, size and shape of the bag to be produced. Thus, the bioleather (1) produced can fully be utilized without any waste or loss.

The culture medium (5) formed during the transfer (103) of microorganism culture (3) into the liquid medium (4) preferably has a temperature of 30 degrees and a pH value between 5 and 7. The growth baths (8) are sterilized with ethanol. In the growth baths (8), the required culture medium (4) is prepared by combining the obtained liquid medium (4) and the culture of the grown microorganisms (3). The culture medium (4) is formed between 7 and 10 days. The temperature of the culture medium (4) is preferably about 30° C. The culture medium (4) has a pH value between 5 and 7. In the process step 103, the growth bath (8) is kept in a dark environment, with its surface covered so as to receive oxygen.

In the bioleather production method (100), after the production of the biopolymer layer (9) in the growth bath (8), the biopolymer layer (9) obtained is washed and purified to obtain a sterile biopolymer layer. As the biopolymer layer (9) is washed, it is cleaned of all culture media (5) and microbial residues. In the process step 104, the biopolymer layer (9) is washed in 70° C. hot water, then in cold water and finally with distilled water, to obtain the sterilized biopolymer layer (S).

In the bioleather production method (100), after the sterile biopolymer layer (S) is obtained (104), the sterile biopolymer layer (S) is vegetable-dyed and tanned. A dyed biopolymer layer (U) is obtained, after the biopolymer layer (S) is vegetable-dyed and tanned (105). Natural and organic root dyes, natural oils and natural flavors are used as dye in the process step (105) of vegetable-dyeing of the biopolymer layer (S). In an embodiment of the invention, indigo is preferably selected as the dye to be used in process step 105. In another embodiment of the invention, food dyes can be used as dye in the process step 105.

In a preferred embodiment of the invention, the sterile biopolymer layer (S) is coloured in process step 105 with a dye containing preferably 5% natural indigo, 2% almond oil, 5-10% glycerol and 20% purified water. Depending on the size of the biopolymer layer (9) to be formed, the ratios of natural indigo, almond oil, glycerol and pure water may vary.

Bacterial cellulose (9) used as the raw material for bioleather (1), enables dye saving as compared to other leather and fabrics since it is obtained from bacteria and has super absorbent power due to the general properties of cellulose. Since the absorbency of natural leathers is very low compared to bioleather (1), the dyeing process is performed so as to be repeated several times. In the preferred embodiment of the invention, the dyeing of the sterile biopolymer layer (S) in the process step 105 is performed in the mold (6). In the preferred embodiment of the bioleather production method (100), dyeing and tanning can be performed simultaneously. This is mainly due to high absorbency of the biopolymer layer (9). The biopolymer layer (9) has high absorbency since it contains bacterial cellulose and is of bacterial type. Since the biopolymer layer (9) is made up of bacterial cellulose and polymer-based, it is more absorbent than natural leather, and the dyeing and tanning process can be performed simultaneously and with less effort.

In the bioleather production method (100), after the dyed biopolymer layer (U) is obtained (105), the same sequence of process steps (process steps 101, 102, 103, 104 and 105) are repeated to obtain a second dyed biopolymer layer (U). The produced dyed biopolymer layer (U) is placed into the mold (6) and yarns (7) are laid thereon (106).

After provision of the required nutrient medium, yarns (7) are preferably placed between at least two nano-surfaces (non-woven surface) which are formed by microorganisms and treated accordingly (vegetable dyeing and tanning). While a natural textile appearance can be given to said bioleather (1) with the help of the yarns (7), the yarn (7) also improves the mechanical properties of the bioleather (1) as it reinforces the bonding of the biopolymer layers (9).

In the bioleather production method (100) of the invention, after yarns (7) are placed (106) on the dyed biopolymer layer (U), a second dyed biopolymer layer (U) is placed thereon (107).

In the bioleather production method (100), following processing step 107, the two dyed biopolymer layers (U) having yarns (7) in between them are bonded with liquid gum arabic and glycerol and preferably with natural adhesives based on 1-5% liquid gum arabic and 1-5% glycerol, depending on the size of said layers. In the bioleather production method (100), the yarns (7) arranged between the two dyed biopolymer layers (U) are bonded with natural adhesives based on 1-5% liquid gum arabic and 3% glycerol.

In the bioleather production method (100) according to this embodiment of the invention, after two dyed biopolymer layers (U) are bonded (108) together with yarns (7) in between them, drying and finishing of the bonded dyed biopolymer layers (U) is performed (109). In the bioleather production method (100) according to this embodiment of the invention, the drying process is known as lamination. In the bioleather production method (100), the dyed biopolymer layers (U) are dried at room temperature for 1-2 days, preferably in sunlight for a minimum of 5 hours within 1 day. In the bioleather production method (100), the drying process can be performed in daylight as well as in a heated indoor environment or in an oven-like space.

In the bioleather production method (100) according to an embodiment of the invention, bioleather (1) is obtained following the drying of dyed biopolymer layers (U) and finishing processes (109)-(110). Different bioleather products (V) can be formed with the obtained bioleather (1). The bioleathers obtained (1) can be sewn, shaped very easily by hand, are flexible and ironable, can be bonded by interlining, and have properties like high absorbency, high water retaining capacity, biocompatibility, high tensile strength and mechanical strength. At the same time, it has antimicrobial properties due to the use of lichen as the main carbon source in the raw material of bioleather (1) and dyeing with natural indigo. The bioleather (1), the raw material of which is the biopolymer layer (9) based on bacterial cellulose, has a cellulose purity of 98-94%. The obtained bioleather (1) is formed by bonding of the dyed yarns (7) between the two dyed biopolymer layers (U).

The bioleather (1) produced by the bioleather production method (100) described in the invention of the present application, can be used in many sectors such as manufacturing of shoes, accessories and clothing, where both genuine leather and artificial leather are used. Thus, different bioleather products (V) (such as shoes, bags, wallets or belts) can be obtained using this bioleather (1). Bacterial cellulose, which is the raw material for the bioleather (1) of the invention of the present application, can be easily produced in fermentation bioreactors such as those used in brewery or yeast production. The celluloses obtained, can be developed for the process subsequent to the process step of obtaining sterile biopolymer layer (S) of the bioleather production method (100) with a sustainable, zero-waste system by forming molds and weaving pulleys according to the targeted size of the leather to be produced.

Static culture fermentation, which takes place in the process step of preparation (102) of the fermentation liquid medium (4) in the bioleather production method (100) of the invention of present application, is an industrial production method with very low carbon emissions. In the invention of the present application, a manufacturing process is achieved in the aforementioned process step 102, which is highly supportive of the green economy and the prevention of climate change. Every waste generated in the bioleather production method (100) in the invention of the present application, is organic, and its mixing with water and soil does not affect the environment and human health.

The bioleather (1) produced by the bioleather production method (100) in the invention of the present application or the bioleather products (V) obtained with the said bioleather (1) decompose in soil within a maximum of 95 days when mixed with soil and are returned to nature as a source by feeding the microorganisms in the soil. In this sense, the bioleather production method (100) enables the production of a sustainable bioleather product (V) by supporting the green economy and zero waste policy. No chemical additives and toxic dyestuffs are used in the bioleather production method (100) in the invention of the present application. The implementation of the bioleather production method (100) of the invention of the present application in the industry and its introduction into the market will lead to a decrease in the demand for animal hide, less greenhouse gas emissions and a decrease in the toxicity associated with tanning, thereby will allow the bioleather thus obtained to be a pioneer in prevention of climate change and promotion of circular economy.

The bioleather (1) obtained with the bioleather production method (100) described in the invention of the present application, is produced between 7 and 10 days under artificial conditions. The bioleather production method (100) of the invention of the present application is more beneficial in comparison to production of leather from animal hide (calf, heifer, sheep, etc.), which entails a waiting period of 3 years for collecting the animal hide and also involves wastage of leather. This time is between 7 and 10 days for the bioleather (1) of the present invention, providing the same appearance and physical properties.

The process steps of the bioleather production method (100) in the preferred embodiment of the invention is carried out as follows. In the bioleather production method (100), firstly a solution is prepared as raw material by adding 8 grams of black tea extract and 25 grams of glucose into 1 liter of purified water (101). When the solution prepared in process step 101 reaches the appropriate temperature, 100 ml of acetic acid and cellulose producing bacteria and/or fungi are added and a grown microorganism culture (3) is prepared by growing the said bacteria or fungi (101). Once the grown microorganism culture (3) is prepared, a solution is prepared by adding preferably 3% black tea extract, 2% green tea extract, and 8% glucose to pure hot water (102). When the solution prepared in process step 102 reaches the appropriate temperature, a fermentation liquid medium (4) is prepared by adding a mixture of 1-5% acetic acid and glycerol and 1-10% lichen thereinto. After the preparation (102) of the fermentation liquid medium (4), the microorganism culture (3) is transferred into growth baths (8) in liquid medium (4) (103). Following the transfer of microorganism culture (3) into the growth baths (8) in the liquid medium (4), pure bacterial biopolymer layer (9) is produced by growth in static culture in the growth bath (8)-(103). After the production of the biopolymer layer (9) in the growth bath (8), the biopolymer layer (9) obtained is washed and purified to obtain a sterile biopolymer layer (S) (104). After the sterile biopolymer layer (S) is obtained (104), the sterile biopolymer layer (S) is vegetable-dyed and simultaneously tanned. A dyed biopolymer layer (U) is obtained, after the biopolymer layer (S) is vegetable-dyed and tanned (105). After the dyed biopolymer layer (U) is obtained (105), the same sequence of process steps (process steps 101, 102, 103, 104 and 105) are repeated to obtain a second dyed biopolymer layer (U). The produced dyed biopolymer layer (U) is placed into the mold (6) and yarns (7) are laid thereon (106). After yarns (7) are placed (106) on the dyed biopolymer layer (U), a second dyed biopolymer layer (U) is placed thereon (107). Following process step 107, the two dyed biopolymer layers (U) with yarns (7) arranged in between them are bonded together using 1-5% liquid arabic gum and 1-5% glycerol-based natural adhesives depending on the size of said layers (108). After the two dyed biopolymer layers (U) are bonded (108) together with yarns (7) in between them, drying and finishing of the bonded dyed biopolymer layers (U) is performed (109). Bioleather (1) is obtained following the drying of dyed biopolymer layers (U) and finishing processes (109)-(110). With the said bioleather production method (110), production of bioleather can be achieved between 7 and 14 days. Different bioleather products (V) can be formed with the obtained bioleather (1).

The invention claimed is:
1. A bioleather production method (100), wherein the bioleather is similar to genuine leather and grown under artificial conditions without chemicals, characterized in that, it comprises the steps of:
preparation of a first solution by addition of black tea extract and glucose into pure water as raw material and addition of acetic acid and cellulose producing bacteria or cellulose producing fungus or cellulose producing bacteria with fungus in the prepared first solution when it reaches a temperature in the interval of 20-40° C. and preparation of a grown microorganism culture (3) by growing said bacteria or fungi (101),
preparation of a second solution by adding 1-10% of black tea extract, 1-10% of green tea extract, and 1-10% of glucose to pure hot water, and when the prepared second solution reaches a temperature below 30° C., preparing fermentation liquid medium (4) by adding 1-5% of acetic acid and glycerol and 1-10% of lichen mixture into the prepared second solution (102),
transfer of the microorganism culture (3) to a growth bath (8) in the liquid medium (4) and production of a pure bacterial biopolymer layer (9) by growing the same in static culture in the growth bath (8)-(103), obtaining a sterile biopolymer layer(S) by washing and purifying the obtained biopolymer layer (9) (104), obtaining a dyed biopolymer layer (U) by vegetable-dyeing and tanning of the sterile biopolymer layer(S)-(105), placement of the produced dyed biopolymer layer (U) into a mold (6) and laying of yarns (7) thereon (106), laying of another dyed biopolymer layer (U) on top of the dyed biopolymer layer (U) having the yarns (7) laid thereon, with the yarns (7) arranged in between both layers (107), bonding of the two dyed biopolymer layers (U) having yarns (7) arranged in between them with liquid gum arabic and glycerol-based natural adhesives (108), drying of the bonded dyed biopolymer layers (U) and performing a finishing process (109), and obtaining a bioleather (1) after drying of the dyed biopolymer layers (U) and performing the finishing process (110).

2. The bioleather production method (100) according to claim 1, characterized in that, the first solution is prepared in the process step (101) of preparation of the grown microorganism culture (3) by addition of 8 grams of black tea extract and 25 grams of glucose into pure water as raw material and addition of 100 ml acetic acid and cellulose producing bacteria or cellulose producing fungus or cellulose producing bacteria and fungus into the prepared first solution when it reaches a temperature below 30° C. and the grown microorganism culture (3) is prepared by growing said bacteria or fungi (101).

3. The bioleather production method (100) according to claim 1, characterized in that, in the process step (101) of preparation of the grown microorganism culture (3), the grown microorganism culture (3) is prepared by adding 100 ml of acetic acid and cellulose producing bacteria and/or fungi into the prepared solution when its temperature drops below 30° C. and by growing the said bacteria or fungi.

4. The bioleather production method (100) according to claim 1, characterized in that, in the process step (101) of preparation of the grown microorganism culture (3), a stock culture (2) is prepared by growing stock kombu moulds containing as the said microorganisms capable of producing cellulose *Komagataeibacter Xylinus*, formerly known as *Acetobacter Xylinum* or *Gluconacetobacter Xylinus* and bacteria of the genus *Bacterium Gluconicum* and yeast of the genus *Saccharomyces Cerevisiae* and *Schizosaccharomyces Pombae*.

5. The bioleather production method (100) according to claim 1, characterized in that, in the process step (101) of preparation of the grown microorganism culture (3), fermentation is carried out using the pure bacterial biopolymer layer (9) as raw material of the bioleather (1), or using the newly grown microorganism culture (3) obtained by growing of pure bacterial cellulose.

6. The bioleather production method (100) according to claim 1, characterized in that, in the process step (102) of preparation of the fermentation liquid medium (4), organic waste fractions of "*Parmelia Sulcata*" and "*Hypogymnia Tubulosa*" lichen species are used as a main carbon and nitrogen source while preparing the fermentation liquid medium (4).

7. The bioleather production method (100) according to claim 1, characterized in that, in the process step (103) of transferring the microorganism culture (3) into the growth bath (8) in liquid medium (4), geometric form (dimensions of width and length) of the growth bath (8) used is identical to geometric form of biopolymer layer (9) and the mold into which the biopolymer layer (9) is placed.

8. The bioleather production method (100) according to claim 1, characterized in that, in the process step (103) of transferring the microorganism culture (3) into the growth bath (8) in liquid medium (4), geometric form of the bioleather (1) is identical to geometric form (dimensions of width and length) of the growth bath (8), biopolymer layer (9) and the mold into which the biopolymer layer (9) is placed.

9. The bioleather production method (100) according to claim 1, characterized in that, in the process step (103) of transferring the microorganism culture (3) into the growth bath (8) in liquid medium (4), a culture medium (5) has a temperature of 30 degrees and a pH value between 5 and 7.

10. The bioleather production method (100) according to claim 1, characterized in that, in the process step (103) of transferring the microorganism culture (3) into the growth bath (8) in liquid medium (4), the growth bath (8) is sterilized with ethanol.

11. The bioleather production method (100) according to claim 1, characterized in that, in the process step (103) of transferring the microorganism culture (3) into the growth bath (8) in liquid medium (4), a required culture medium (5) is prepared by combining the liquid medium (4) obtained in the growth bath (8) and the grown microorganism culture (3).

12. The bioleather production method (100) according to claim 1, characterized in that, in the process step (103) of transferring the microorganism culture (3) into the growth bath (8) in liquid medium (4), a culture medium (5) is formed in a period between 7 and 10 days.

13. The bioleather production method (100) according to claim 1, characterized in that, in the process step (103) of transferring the microorganism culture (3) into the growth bath (8) in liquid medium (4), the temperature of the culture medium (4) is 30° C.

14. The bioleather production method (100) according to claim 1, characterized in that, in the process step (103) of transferring the microorganism culture (3) into the growth bath (8) in liquid medium (4), a culture medium (5) has a pH value between 5 and 7.

15. The bioleather production method (100) according to claim 1, characterized in that, in the process step (103) of transferring the microorganism culture (3) into the growth bath (8) in liquid medium (4), the growth bath (8) is kept in a dark environment, with its surface covered so as to receive oxygen.

16. The bioleather production method (100) according to claim 1, characterized in that, in the process step (104) of obtaining the sterile biopolymer layer(S) by washing and purification of the biopolymer layer (9), the biopolymer layer (9) is cleaned of all culture media (5) and microbial residues as it is washed.

17. The bioleather production method (100) according to claim 1, characterized in that, in the process step (104) of obtaining the sterile biopolymer layer(S) by washing and purification of the biopolymer layer (9), before washing, the biopolymer layer (9) is washed in 70° C. hot water, then in cold water and finally with distilled water to obtain the sterilized biopolymer layer(S).

18. The bioleather production method (100) according to claim 1, characterized in that, in the process step (105) of obtaining dyed biopolymer layer (U); natural and organic root dyes, natural oils and natural flavors are used as dye during the vegetable-dyeing of the biopolymer layer(S).

19. The bioleather production method (100) according to claim 1, characterized in that, in the process step (105) of obtaining dyed biopolymer layer (U) indigo is selected as dye.

20. The bioleather production method (100) according to claim 1, characterized in that, in the process step (105) of obtaining dyed biopolymer layer (U) food dyes are used as dye.

21. The bioleather production method (100) according to claim 1, characterized in that, in the process step (105) of obtaining dyed biopolymer layer (U), the sterile biopolymer layer(S) is coloured with a dye containing 5% natural indigo, 2% almond oil, 5-10% glycerol and 20% purified water.

22. The bioleather production method (100) according to claim 1, characterized in that, in the process step (105) of obtaining dyed biopolymer layer (U), ratios of natural indigo, almond oil, glycerol and pure water may vary depending on the size of the biopolymer layer (9) to be formed.

23. The bioleather production method (100) according to claim 1, characterized in that, in the process step (105) of obtaining dyed biopolymer layer (U) the dyeing process is performed in the mold (6).

24. The bioleather production method (100) according to claim 1, characterized in that, in the process step (106) of laying yarns (7) on the dyed biopolymer layer (9), yarns (7) selected from raw and natural materials are used.

25. The bioleather production method (100) according to claim 1, characterized in that, in the process step (106) of laying yarns (7) on the dyed biopolymer layer (9), natural fiber-containing yarns (7) are used, which are obtained from plant fibers.

26. The bioleather production method (100) according to claim 1, characterized in that, in the process step (106) of laying yarns (7) on the dyed biopolymer layer (9), while forming the yarns (7), dyeing process is performed with 1-10% coconut oil, 1-10% glycerol and 1-3% natural aromas.

27. A bioleather (1) produced by the bioleather production method (100) as in claim 1, characterized in that it is used as shoes, bags, belts, and watches.

* * * * *